United States Patent Office 3,231,477
Patented Jan. 25, 1966

3,231,477
FINNED NUCLEAR REACTOR FUEL ELEMENT
Alan Charles Anthony Saunders, Ribbleton, and Ronald Scott Challender, Appleton, Warrington, England, assignors to United Kingdom Atomic Energy Authority, London, England
Filed Dec. 21, 1961, Ser. No. 161,091
Claims priority, application Great Britain, Dec. 28, 1960, 44,436/60; Jan. 12, 1961, 1,319/61
3 Claims. (Cl. 176—81)

This invention relates to finned tubular bodies the fins being integral with the body and the invention is concerned principally with the manufacture of finned sheaths suitable for containing nuclear fuel to make fuel elements for use in a gas-cooled nuclear reactor.

A fuel element in a gas-cooled nuclear reactor is usually of a size and so located in a channel in the reactor that there is an unimpeded annulus for coolant flow between the tips of the heat transfer finning of the element and the channel wall. It has long been appreciated that for good heat transfer conditions, the coolant in the annulus and the coolant between the heat transfer finning should frequently change position, the change taking place in a smooth manner. Thus there has developed in recent times a fuel element known as a "helical polyzonal element," that is, an element having helical heat transfer fins integral with the sheath and having coolant flow guide vanes which intersect the heat transfer fins and extend beyond the heat transfer fins to reach to the channel wall to divide the channel into a number of zones in each of which intermixing occurs between the coolant in between the heat transfer fins and the coolant in the zone defined by the channel wall and the guide vanes.

The polyzonal element represents an advance on other types of element (such as the simple longitudinal, helical or circumferential finned elements) the advantage lying chiefly in its improved heat transfer characteristics. The improvement is such as to make the element acceptable even against certain attendant disadvantages such as the introduction of further absorber into the reactor, the increased pressure loss caused by the guide vanes and by devices to secure them, the increased cost in manufacture, and the need to provide some stabilising device to prevent the elements vibrating when subject to coolant flow.

The present invention seeks to provide a finned tubular body suitable as a sheath for nuclear fuel, the fins being integral with the body and offering a heat transfer performance not appreciably different from that offered by a polyzonal element, yet which does not suffer, to the same extent, from the disadvantages referred to above in relation to the polyzonal element.

The finned tubular body according to the present invention has heat transfer fins integral with the body, the fins being disposed in an even number of sectors around the body and the fins in adjacent sectors being inclined to one another in opposite directions, characterised in that the fins in any sector are of a shape as would be defined by the following method of manufacture, namely, that of fin shaping by a removable die part for each sector.

(The shape of the fins is purposely defined by their method of manufacture as suitable conventional terminology does not exist to define accurately all the shapes envisaged as being within the scope of the invention. Of course, it is not intended that the fins must be shaped by a removable die. As will be seen below, the fins can be made by cutting techniques.)

The invention will now be further described, by way of example, with reference to the accompanying drawings wherein:

FIGS. 1a, 2a, 3a, and 4a show sectional end views of four finned tubes.

FIGS. 1b, 2b, 3b and 4b show a "quadrant developed" view of FIGS. 1a–4a respectively, that is, each section of FIGS. 1b–4b shows an elevation taken on a quadrant of FIGS. 1a–4a.

FIG. 4c is a die suitable for making the tube shown in FIG. 4a.

FIG. 5 is a perspective view of a fuel element having a finned tubular sheath similar to that shown in FIG. 4a.

Figure 1A:
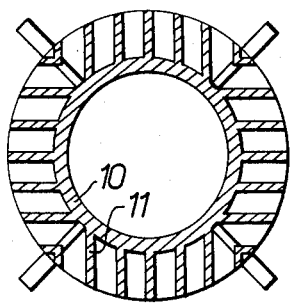
Figure 1B:
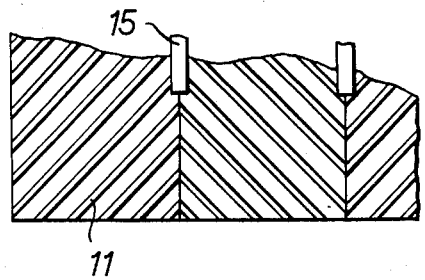

In FIGS. 1a and 1b there is shown a magnesium alloy tube 10 having heat transfer fins 11 integral with the tube 10. The fins 11 are flat, they occupy four sectors around the tube 10, they are parallel in the sectors, they are inclined at 45° to the direction defined by the length of the tube 10, and they are inclined in opposite directions in adjacent sectors. Typical dimensions are 2.5 cm. internal diameter for the tube 10 and 5.0 cm. external diameter on the fins 11. The tube 10 is 110 cm. long, the fin thickness is 2.5 mm. and the spacing between the fins is 5.0 mm.

Figure 1C:
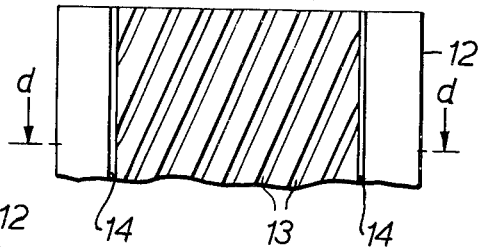
FIG. 1c is a die suitable for making the tube shown in FIG. 1a and FIG. 1d is a section on the line d—d of FIG. 1c.
Figure 1D:
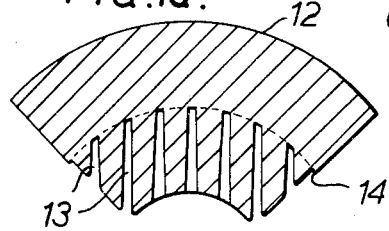

The finned tube shown in FIGS. 1a and 1b may be made by outward extrusion into a die having four segments 12 as shown in FIGS. 1c and 1d. Each segment has slightly tapered recesses 13 which are parallel one with another and are straight in both elevation and plan and extending, as shown in the drawing, from the left hand upwards to the right hand. Second and third parts of the die to be used adjacent to the segment 12 are provided with recesses extending in the opposite direction, that is from the bottom right hand upwards to the top left hand. The fourth part of the die, which is assembled opposite the first part, is grooved like the first part. All parts of the die have a recessed portion 14. The recess 14 causes a longitudinal rib to be formed. By increasing the radial depth of the recess 14 beyond the fin tip radius a deep fin 15 (FIGS. 1a and 1b) can be extruded beyond the heat transfer fins. This fin 15 is then cut away at its ends to leave a central portion which is used as an anti-bowing support. The die segments 12 may be used for inward forging in lieu of outward extrusion. The fins could also be made by machining with an end-milling cutter.

Figure 2A:
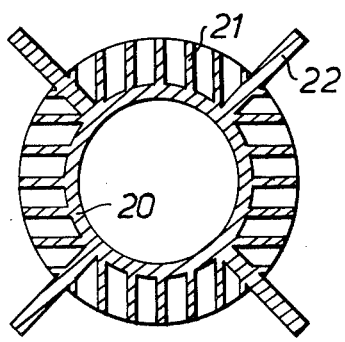
Figure 2B:
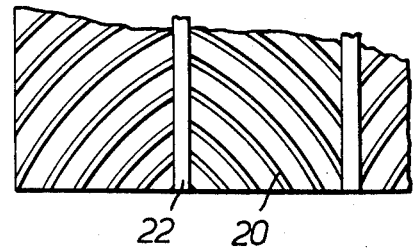

In FIGS. 2a and 2b there is shown a magnesium alloy tube 20 having curved heat transfer fins 21 integral with the tube 20 and parallel in the sectors. The fins curve from a direction which is 40° to the direction defined by the length of the tube 10 to a 60° direction. Four deep fins 22 are provided. The finned tube 20 may be made with dies similar to those described with reference to FIGS. 1c and 1d with the modification, of course, of curvature on the grooves 13 and dispensing of the groove 14.

Figure 3A:
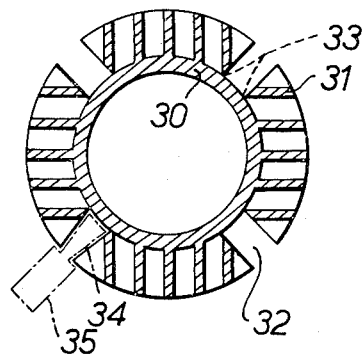
Figure 3B:
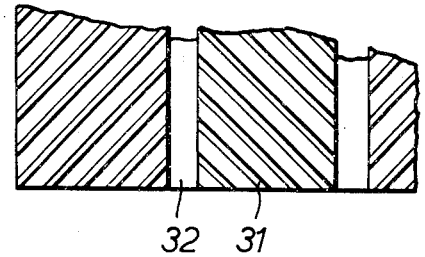

The tube of FIGS. 3a and 3b has much in common with that shown in FIGS. 1a and 1b. It consists of a tube 30 with flat heat transfer fins 31. However in place of the four integral anti-bowing fins 15 deep longitudinal grooves 32 are machined into the heat transfer fins 31. The fins 31 on this form of tube can be made by machining with a slot cutting wheel traversing an arc of less than 90° thus leaving solid material (dotted line 33) at the junction of the quadrants. This solid material is machined away by a longitudinally moving slot cutting wheel to produce the grooves 32. If the solid material is removed by a shaped milling cutter a conical shaped slot 34 can be obtained in which can be secured (by virtue of a conical root) on antibowing brace 35 (shown dotted).

Figure 4C:
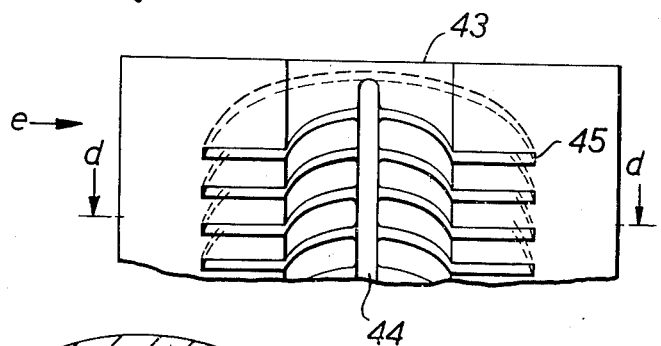
Figure 4D:
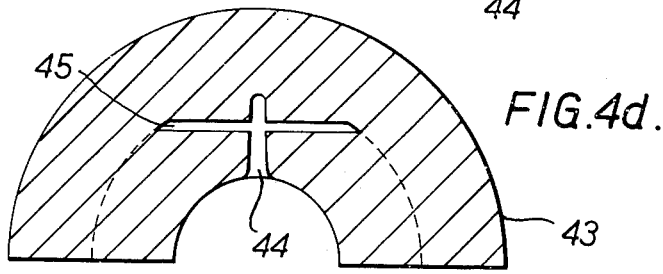
FIG. 4d is a section on the line d—d of FIG. 4c
Figure 4E:
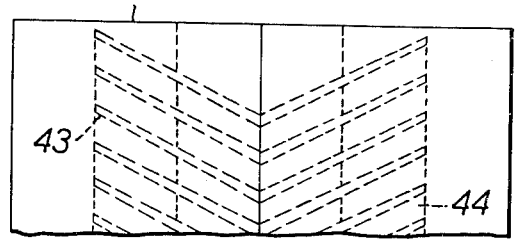
FIG. 4e is a view in the direction of arrow e of FIG. 4c.
Figure 4A:
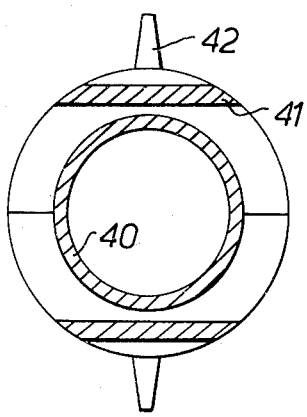
Figure 4B:
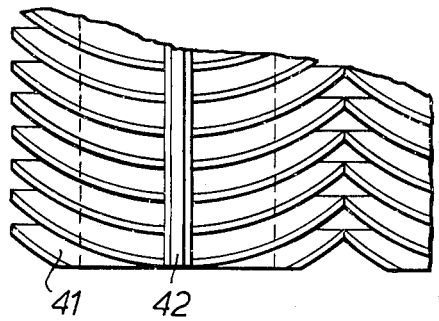

In FIGS. 4a and 4b there is shown a tube 40 having integral heat transfer fins 41 disposed in two sectors around the tube 40 the fins being inclined to one another in opposite directions and inclined at 60° to the length of the tube. Two integral fins 42 are provided to give anti-bowing strength in the weakest direction.

Dies for making the tube of FIGS. 4a and 4b are shown in FIGS. 4c–4e. The dies (which are in two parts) comprise a body 43 having a longitudinal slot 44 (for the fin 42) and a series of inclined slots 45 (for the fins 41).

The fins 41 could also be formed by using a milling cutter.

Figure 5:
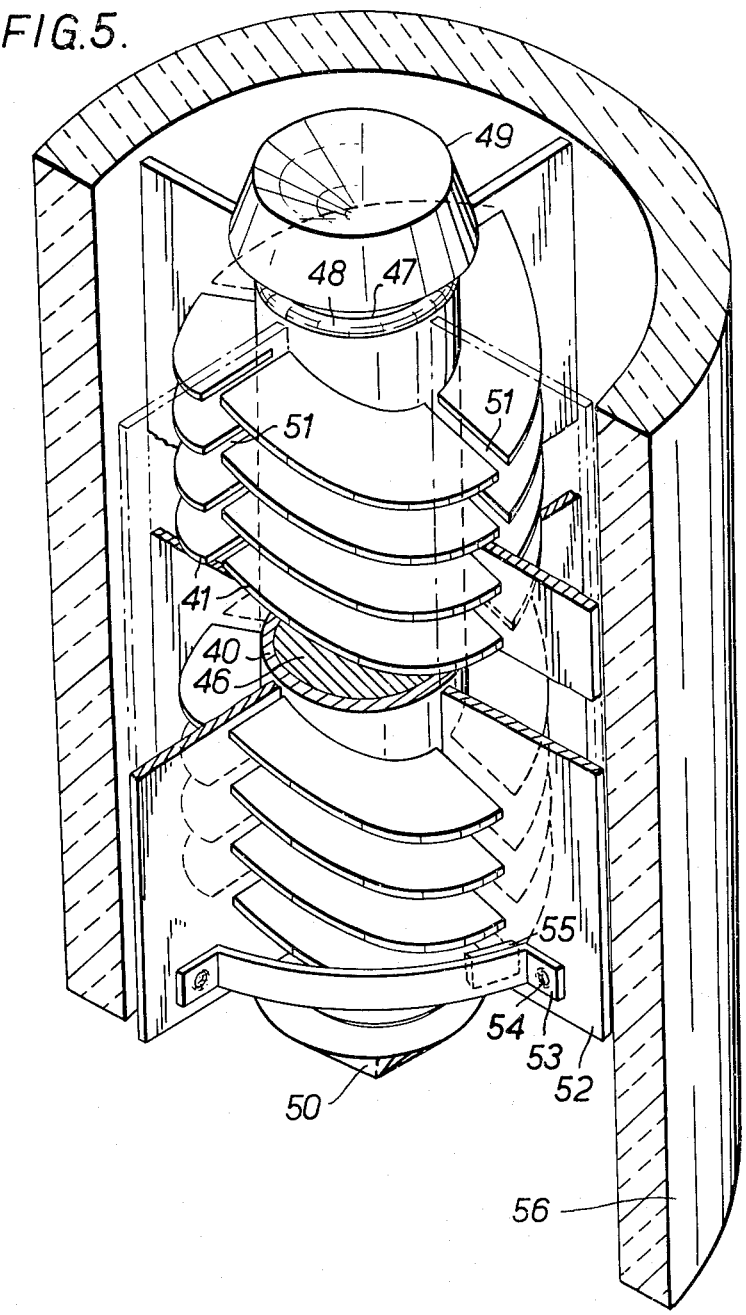

In FIG. 5 the tube 40 and integral heat transfer fins 41 of FIG. 4 are used. The tube contains a uranium metal nuclear fuel rod 46 and is sealed at both ends by an end closure member 47 welded (at 48) to the tube 40. The top closure member has attached to it a conical cup 49 and the bottom closure member has attached to it a locating cone 50. The fins 41 have slots 51 defining four quadrants. Deep fins 52 are located in the slots and held by braces 53 spot welded to the fins 52 (at welds 54).

The braces carry a block 55 which serves to support the assembly of fins 52 and braces 53 on the heat transfer fins. The fuel element of FIG. 5 is shown in a graphite sleeve 56 which represents a fuel channel in a nuclear reactor.

We claim:

1. An elongate nuclear reactor fuel element comprising a nuclear fuel member, a protective sheath of circular cross-section enclosing the nuclear fuel member, and longitudinally-inclined heat transfer fins integral with the sheath, the fins being individually planar and being disposed in an even number of sectors around the sheath with fins in adjacent sectors inclined equally but in opposite directions and longitudinal integral strengthening fins provided between each of said sectors.

2. An elongate nuclear reactor fuel element comprising a nuclear fuel member, a protective sheath enclosing the nuclear fuel member, and heat transfer fins integral with the sheath, the fins being disposed around the sheath in an even number of longitudinally extending sectors and being in the form of plates of which the surface is curved in one dimension only such that the straight line generator of the surface, when produced, intersects the sheath and longitudinal integral strengthening fins provided between each of said sectors.

3. An elongate nuclear reactor fuel element comprising a nuclear fuel member, a protective sheath enclosing the nuclear fuel member, and longitudinally inclined heat transfer fins integral with the sheath, the fins being individually planar and being disposed in two equal sectors around the sheath with fins in adjacent sectors inclined equally but in opposite directions, and having longitudinal integral strengthening fins provided midway round each sector.

References Cited by the Examiner

UNITED STATES PATENTS

| | | | |
|---|---|---|---|
| 1,328,276 | 1/1920 | Fuchs. | |
| 1,339,970 | 5/1920 | Murray et al. | 29—157.4 |
| 1,709,745 | 4/1929 | Schroers | 29—157.4 |
| 3,030,292 | 4/1962 | Ritz | 176—83 |

FOREIGN PATENTS

| | | |
|---|---|---|
| 1,218,482 | 12/1959 | France. |
| 1,260,820 | 4/1961 | France. |
| 849,484 | 9/1960 | Great Britain. |

REUBEN EPSTEIN, *Primary Examiner.*

OSCAR R. VERTIZ, CARL D. QUARFORTH,
*Examiners.*

R. C. LYNE, R. L. GRUDZIECKI, *Assistant Examiners.*